(12) United States Patent
Kwack

(10) Patent No.: US 8,652,243 B1
(45) Date of Patent: Feb. 18, 2014

(54) GAS FILTRATION SYSTEM

(71) Applicant: Sam Yung Kwack, Bishopville, MD (US)

(72) Inventor: Sam Yung Kwack, Bishopville, MD (US)

( * ) Notice: Subject to any disclaimer, the term of this patent is extended or adjusted under 35 U.S.C. 154(b) by 0 days.

(21) Appl. No.: 13/966,555

(22) Filed: Aug. 14, 2013

(51) Int. Cl.
*B01D 47/02* (2006.01)

(52) U.S. Cl.
USPC ............... 96/352; 96/238; 96/239; 96/244; 96/245; 96/279; 96/329; 96/332; 96/351; 95/223; 95/226; 261/124

(58) Field of Classification Search
USPC .......... 96/245, 278, 279, 329, 332, 351, 352, 96/353, 236, 237, 238, 239; 95/223, 226; 261/77, 119.1, 121.1, 124
See application file for complete search history.

(56) References Cited

U.S. PATENT DOCUMENTS

| | | | | |
|---|---|---|---|---|
| 4,212,656 A * | 7/1980 | Lube | .............................. | 96/240 |
| 5,996,975 A * | 12/1999 | Shin | ............................... | 261/87 |
| 6,893,484 B2 * | 5/2005 | Thomas | ......................... | 95/226 |
| 7,056,367 B2 * | 6/2006 | Trivett | ............................ | 95/226 |
| 8,128,742 B1 * | 3/2012 | McGuffin | ....................... | 96/279 |
| 8,206,495 B2 * | 6/2012 | Kwack | ............................ | 96/278 |
| 8,313,564 B2 * | 11/2012 | Kwack | ............................ | 95/223 |

* cited by examiner

*Primary Examiner* — Robert Clemente
(74) *Attorney, Agent, or Firm* — Lowe Hauptman & Ham, LLP

(57) ABSTRACT

A gas filtration apparatus includes a first pipeline configured to divide transmitted gas and air to second and third gas flows, transmit the second and third gas flows to second pipeline bundle which is configured to divide each of the second and third gas flows to two or more gas flows and transmit the divided gas flows to a plurality of filters, a purifying tank configured to contain first water for purifying the divided gas flows, a plurality of filters positioned in a lower space of the purifying tank and configured to disintegrate one or more bubbles created by the divided gas flows, and a gas outlet configured to collect a plurality of bubbles emitted from the first water and release the collected bubbles to the outside of the gas filtration apparatus.

19 Claims, 8 Drawing Sheets

GAS FILTRATION SYSTEM

TECHNICAL FIELD

This present disclosure is related to a gas filtration apparatus and system, and more particularly, a gas filtration system cleaning noxious gases emitted from equipment which burn fossil/fuel, such as, incinerators, oil refineries, rubber factories, plastic factories, large container boats, energy plants, etc. through methods of splitting the incoming gas by passing a gas flow to the aqueous solution to perform the filtration.

BACKGROUND

Due to the rapid development of economies and industries all over the world, greenhouse/noxious gases and particulate matter have been increasingly released into the environment. Common greenhouse/noxious gases in the Earth's atmosphere contain carbon dioxide, sulphur dioxide, methane, nitrous oxide, ozone, and chlorofluorocarbons. The emissions of these noxious gases bring many issues, such as acid rain and/or the greenhouse effect which is one of several factors that affect the temperature of the Earth and cause global warming. As a result of the air pollution, significant efforts have been made to reduce the gas contamination in these gaseous emissions.

Over the years, a number of devices have been developed for filtrating gases, such as, the scrubbing exhaust gases. However, most devices have complicated structures thereby increasing cost of the devices. Further, the methods for scrubbing gases in the art in some instances require a complex process to achieve desired efficiency. Some examples of conventional apparatus for scrubbing gases are exemplified as follows.

One apparatus for scrubbing either acidic or alkaline impurities from gas streams is disclosed in Thomas (U.S. Pat. No. 6,893,484). Specifically, as seen in Figures of Thomas, gas is introduced into a container and passed through a plurality of tubes that are located in a lower section or portion of the container. The gas is then released from holes on the tubes into a sealed space containing liquid absorbent substance. Finally, the cleansed gas passes through a metal mesh and is released out of the container.

Another method for scrubbing gases is disclosed in Trivett (U.S. Pat. No. 7,056,367). Trivett discloses a method for scrubbing gases, i.e., the gases are pushed into a liquid tank and passed through scrubbing liquid. The gases then flow in a reverse direction through mixing vanes, thereby creating tiny bubbles to enhance the interaction of the gaseous pollutants with the scrubbing liquid.

Further, as disclosed in Lube (U.S. Pat. No. 4,212,656), a smoke scrubbing system involves spraying water to promote cleaning of the smoke. In this arrangement, the smoke passes through several chambers to fully interact with the water spray. The scrubbed smoke is then released out from the containers. In order to achieve the maximum efficiency, Lube provides several nozzles that have a fan spray type to induce the water and effectively contact the smoke. This arrangement inevitably increases the cost of producing such a smoke scrubbing system and it is likely to be difficult to repair/maintain the nozzles which are disposed inside each container.

Many more examples of developments in the art are directed to similar subject matter.

SUMMARY

Exemplary embodiments relate to a gas filtration apparatus and a gas filtration system.

A gas filtration apparatus according to some embodiments comprises a gas suction unit configured to transmit a first gas flow which includes a polluted gas and external air to a first pipeline, the first pipeline configured to divide the first gas flow into a second gas flow and a third gas flow, and transmit the second and third gas flow to a second pipeline bundle, the second pipeline bundle configured to divide each of the second and third gas flow into two or more gas flows, and transmit each of the divided two or more gas flows to each of a plurality of filters, a purifying tank configured to contain first water for purifying a gas released from a plurality of filters, the plurality of filters positioned in the purifying tank to be sunk under the first water, and configured to disintegrate one or more bubbles created by the divided two or more gas flows from the second gas flow and the third gas flow, and a gas outlet configured to collect a plurality of bubbles emitted from the first water, and release the collected bubbles as a filtered gas flow to the outside of the gas filtration apparatus.

A gas filtration system according to some embodiments includes the gas filtration apparatus, an incinerator configured to incinerate the filtered gas flow, a septic tank configured to purify waste water released from the gas filtration apparatus, and a precipitation tank configured to precipitate one or more impurities included in at least one of the waste water released from the gas filtration and waste water released from the septic tank.

A gas filtration system according to some embodiments includes a plurality of the gas filtration apparatus, one or more connecting pipelines configured to transmit the filtered gas flow released from the gas outlet of one of the plurality of the gas filtration apparatus to the gas suction unit of another one of the plurality of the gas filtration apparatus, and waste water pipes configured to collect waste water released from the plurality of the gas filtration apparatus, and transmit the collected waste water to a septic tank.

DETAILED DESCRIPTION

Hereinafter, various embodiments will be described in detail with reference to the accompanying drawings. The figures are provided to enable those of ordinary skill in the art to make and use the exemplary embodiments.

Figure 1:
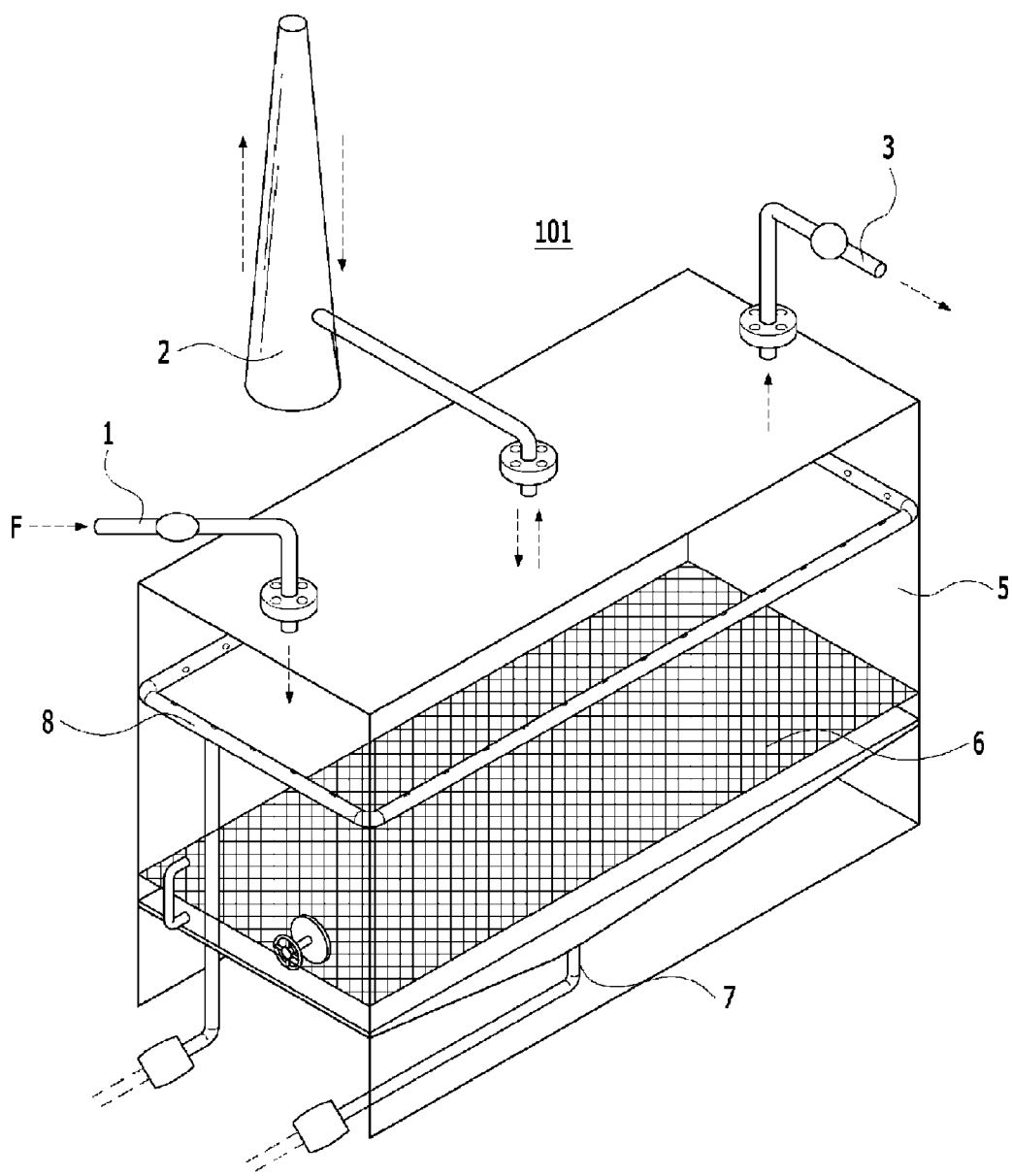
FIG. 1 is a perspective view showing a gas suction unit of a gas filtration apparatus according to some embodiments.

FIG. 1 is a perspective view showing a gas suction unit of a gas filtration apparatus according to some embodiments.

Referring to FIG. 1, a gas suction unit 101 of a gas filtration apparatus includes a gas inlet 1, an air inlet 2, a first pipeline 3, a gas suction tank 5, a second impurity collector 6, a waste water outlet 7, and a water spray 8.

According to some embodiments, a polluted gas is transmitted from one or more plants which need a gas filtration, through the gas inlet 1. In addition to the polluted gas, external air is transmitted from the outside of the gas filtration apparatus through the air inlet 2. The external air includes a smoke, smell, and steam which are emitted from a factory. The polluted gas and the external air are transmitted as a first gas flow.

In some embodiments, the external air is sucked by a suction motor configured to suck the external air into the inside of the gas suction unit. The gas suction unit 101 includes the suction motor. The suction motor assists the gas suction unit to transmit the first gas flow smoothly into a purifying tank through the first pipeline by utilizing strong air pressure. For example, when the first gas flow contains a combination of the polluted gas and the external air in the amount of 100, the suction motor brings an additional external air amount of 50. Then, the total mixture of the first gas flow is an amount of 150. Thus, the first gas flow has strong air pressure and is smoothly transmitted into the purifying tank through the first pipeline.

In some embodiments, the gas suction unit 101 includes a control unit for controlling suction of the external air. By using the control unit, the gas suction unit detects whether the suction motor is working properly. Further, if the suction motor is not working properly, the gas suction unit releases the polluted gas to the outside of the gas filtration apparatus without transmitting the first gas flow to the first pipeline. Otherwise, if the suction motor is working properly, the gas suction unit transmits the first gas flow to the first pipeline. In some embodiments, the control unit is placed on the first pipeline.

In some embodiments, the gas suction unit 101 includes the gas suction tank 5 that includes second water for settling one or more impurities included in the first gas flow. The second water comprises of at least one part of pure water, purified water, or solution of chemicals for purifying.

In some embodiments, the gas suction unit 101 includes the second impurity collector for collecting one or more settled impurities. The micro impurities ash which is heavier than the gases, and dusts, from the polluted gas and external air inhaled from the outside of the gas suction unit, are fallen into the second water. And then, the second impurity collector collects the impurities to filter out the impurities from the second water. Other impurities which the second impurity collector does not filter out are transmitted to the first pipeline 3 for further purifying. Further, the gas suction unit 101 also includes the waste water outlet 7 for releasing waste water transmitted from the second impurity collector. In some embodiments, the water is transmitted to a septic tank. The gas suction unit 101 releases the waste water containing some impurities, e.g., a(n) dust, mist, ash and debris to filtering the first gas flow. Further, a walk plate 6 is placed in the gas suction unit 101. The walk plate is used for cleaning work by an administrator of the gas filtration apparatus.

In some embodiments, the gas suction unit 101 detects an empty state of the gas suction tank 5 after releasing the waste water. Further, when the empty state is detected, the water spray 8 sprays the second water to a sidewall of the gas suction tank 5 to fill the second water in the gas suction tank 5 for supplying the second water again. Through this operation, the impurities on the side wall of the gas suction tank 5 are cleaned. Further, the water spray stops to spray when the sprayed water filled in the gas suction tank 5 reaches a predetermined amount. The predetermined amount of the water is set by an administrator and detected by a sensor which is installed in the gas suction tank 5.

Figure 2:
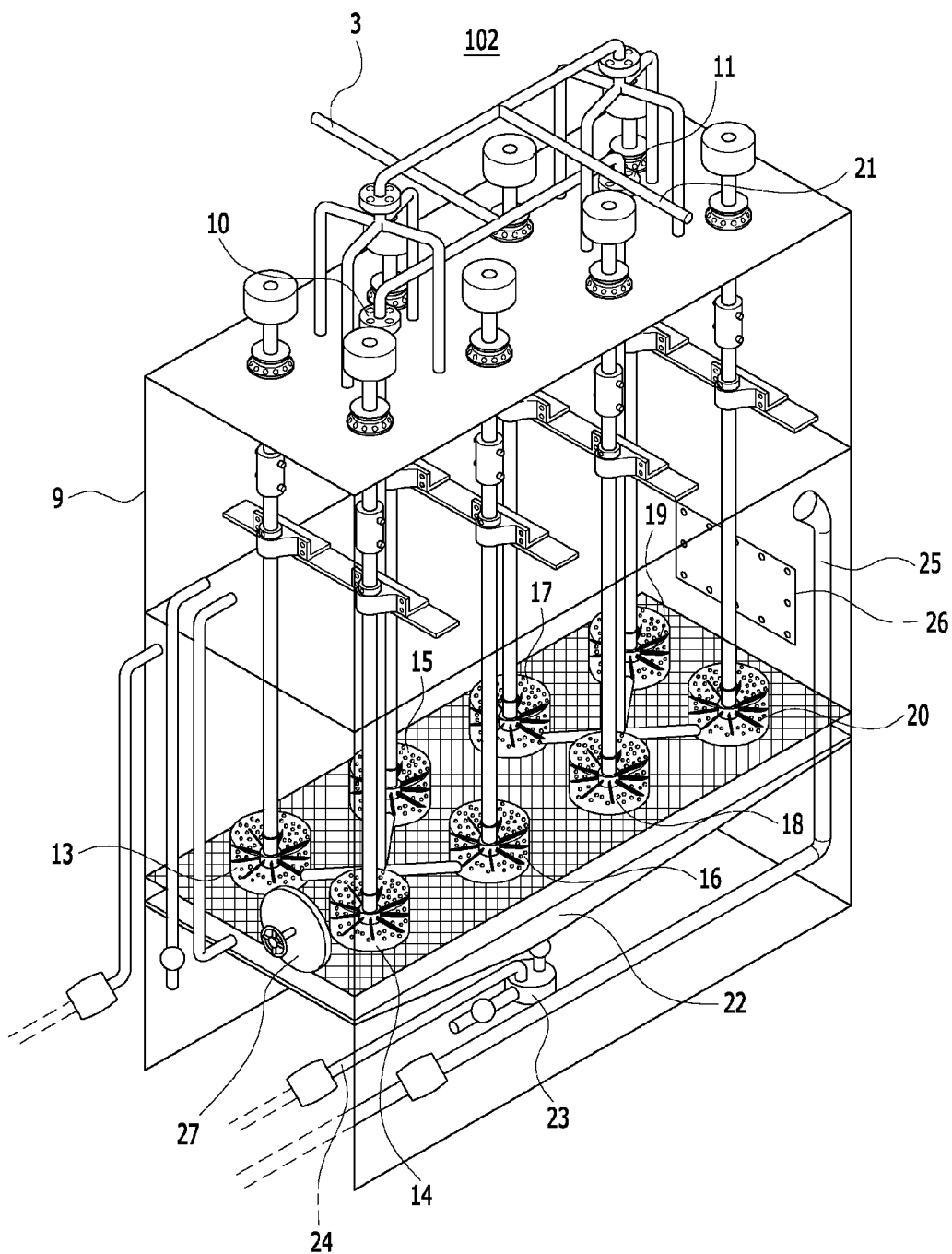
FIG. 2 is a perspective view showing a gas filtration apparatus according to some embodiments.

FIG. 2 is a perspective view showing a gas filtration apparatus according to some embodiments.

In some embodiments, the gas filtration apparatus includes the gas suction unit 101 shown in FIG. 1, the first pipeline 3, a purifying tank 9, the second pipeline 10, the third pipeline 11, the first to eighth filters 13-20, and a gas outlet 21.

The gas suction unit 101 transmits a first gas flow which includes a polluted gas and external air to the first pipeline 3. The first pipeline 3 divides the first gas flow into a second gas flow and a third gas flow, and the second and third gas flows are transmitted to a second pipeline bundle including the second pipeline 10 and the third pipelines 11. In some embodiments, the first pipeline 3 splits the first gas flow in half.

The second pipeline 10 further divides the divided first gas flow into two or more gas flows, and the third pipeline 11 also divides the divided first gas flow into two or more gas flows. Thus, the first gas flow, which includes the polluted gas and the external air, is divided into a plurality of gas flows to be transmitted to a plurality of filters. In some embodiments, each of the second and third pipelines divides each of the second and third gas flow into four parts. In this embodiment, each of eight parts of the first gas flow is transmitted to each of the first to eighth filters 13-20.

The purifying tank 9 contains first water for purifying a gas released from the plurality of filters. In some embodiments, the plurality of filters includes the first to eight filters 13-20, as shown in FIG. 2. The first water is at least one of at least one of pure water, purified water, and solution of chemicals for purifying.

In some embodiments, the plurality of filters is positioned in a lower space of the purifying tank 9. Thus, the filters are to be sunk under the first water. One or more bubbles are created by one or more gases released in the filters from ends of the second and third pipelines.

The first water begins to bubble when one or more gases released from the end of the second and third pipelines. The released one or more gases from the second and third pipelines are filtered by the filter, and the filtered one or more gases are purified by the first water when the filtered one or more gases are passed through the first water. The purified one or more gases are emitted from the first water.

In some embodiments, the purifying tank 9 further includes an impurity inlet 25 for inhaling impurities from the first water. The impurity inlet 25 removes the impurities, which float on the first water. The first water in the purifying tank 9 is kept clean by the impurity inlet 25.

In some embodiments, the purifying tank 9 further includes the first impurity collector 22, which collects sediments settled in the bottom of the first water. The first water, that is passed through the first impurity collector 22 is filtered by an iron particle collector 23. One or more impurities, such as a rock, sand, or piece of iron, are strained out by the iron particle collector for protecting the drain pipe or other facilities in the gas filtration system from damage. The first water then moves to the outside of the tank through a drain pipe 24. In some embodiments, the drain pipe 24 includes a time switch, which allows the drain pipe to release the first water and fill new first water periodically.

In some embodiments, the gas outlet 21 collects a plurality of bubbles emitted from the first water, and then, the gas outlet 21 releases the collected bubbles as a filtered gas flow to the outside of the gas filtration apparatus. Further, the purifying tank 9 includes a first tank door 27 and second tank door 26. An administrator enters to the inside of the purifying tank 9 for cleaning through the first tank door 27. The administrator uses a walking plate 28 to stand in the purifying tank 9. The second tank door 26 is also used by the administrator who wants to enter to the inside of the purifying tank 9 for fixing a problem of the purifying tank 9. The cleaned gas is released from the gas filtration system according to the gas filtration apparatus as shown in the FIG. 2.

Figure 3:
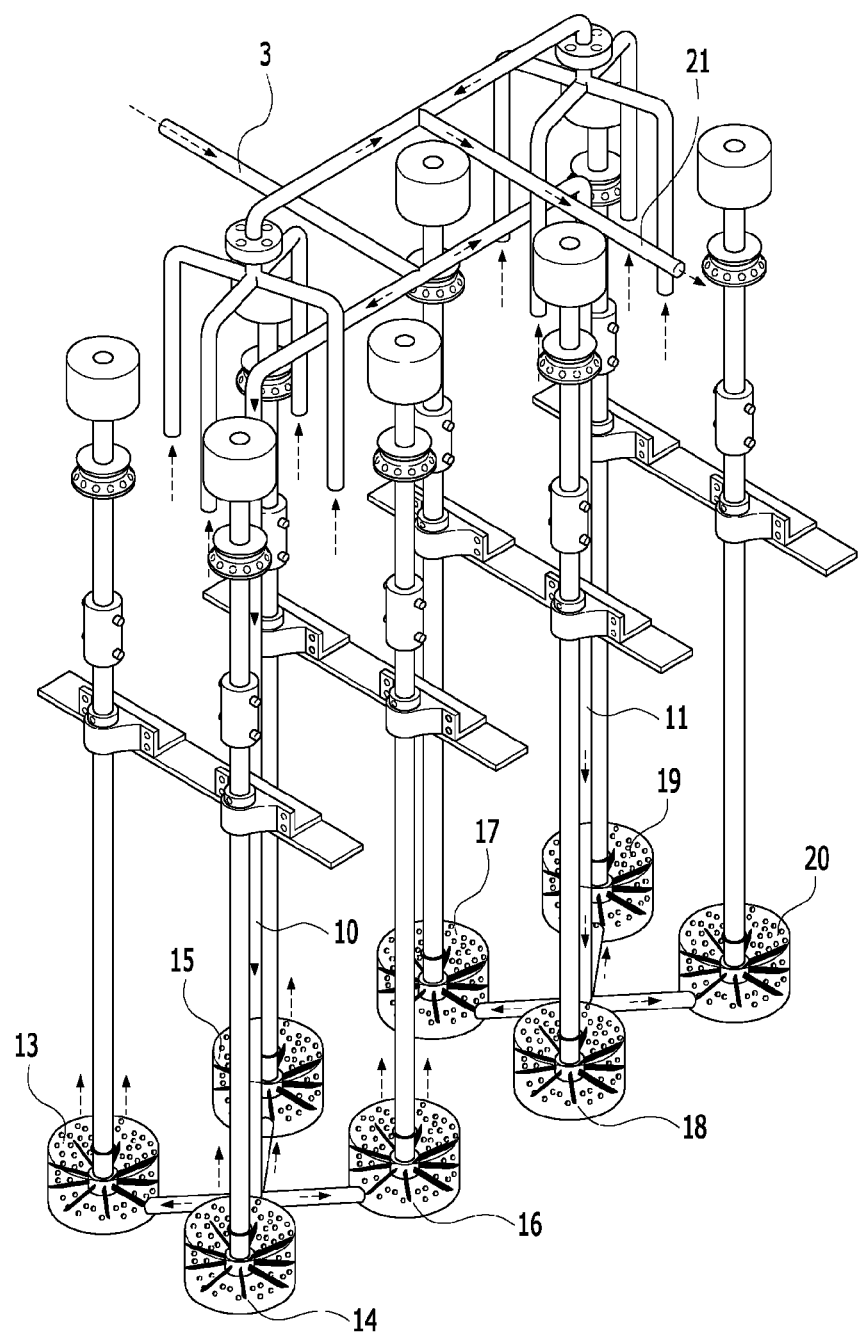
FIG. 3 is a perspective view showing a plurality of filters of a gas filtration apparatus according to some embodiments.

FIG. 3 is a perspective view showing the plurality of filters of a gas filtration apparatus according to some embodiments.

According to FIG. 3, when the polluted gas and external air is transmitted through the first pipeline, a first gas flow including the gas and air are divided at the end of the first pipeline into a second and a third gas flow. In some embodiments, both the gas and air are divided in half. For example, if a first gas flow containing the polluted gas and external air in the amount of 150, then each divided first gas flow with the amount of 75 is transmitted into the second pipeline 10 and third pipeline 11.

Each of the second and third gas flows are further divided into two or more gas flows at the end of the second pipeline 10 and the third pipelines 11. The second pipeline divides the second gas flow into two or more gas flows and transmits each of the divided two or more gas flows to each of a plurality of filters. Likewise, the third pipeline divides the third gas flow into two or more gas flows, and transmits each of the divided two or more gas flows from the third gas flow to each of the plurality of filters.

In some embodiments, as shown in FIG. 3, the second pipeline divides the second gas flow into four gas flows, and the third pipeline divides the third gas flow into four gas flows. The plurality of filters includes eight physically separated filters. The polluted gas and external air are therefore divided into eight parts and released from first to eighth filters 13-20. For example, each mixture of the polluted gas and external air in the amount of 18.75 is released in the first to eighth filters 13-20. Each of the released gases in the first to eighth filters 13-20 begins to create one or more bubbles in the filters, because the filters are positioned in a lower space of the purifying tank 6 to be sunk under the first water.

The created one or more bubbles are filtrated by the filters. After being filtrated by the filters, the gas is released from the filters. The released gas is further purified when the gas passes the first water. For example, the released gas is purified in the first water through the process of inhalation, absorption and filtration while it pops up out of the first water. After the purification, a plurality of bubbles is emitted from the first water to the outside of the gas filtration apparatus or other facility.

As shown in FIG. 3, the polluted gas and the external air is divided into eight parts, and the divided eight parts are filtrated by the first to eighth filters 13-20. In some embodiments, however, the number of filters and division numbers of the gas flow are flexible.

Figure 4:
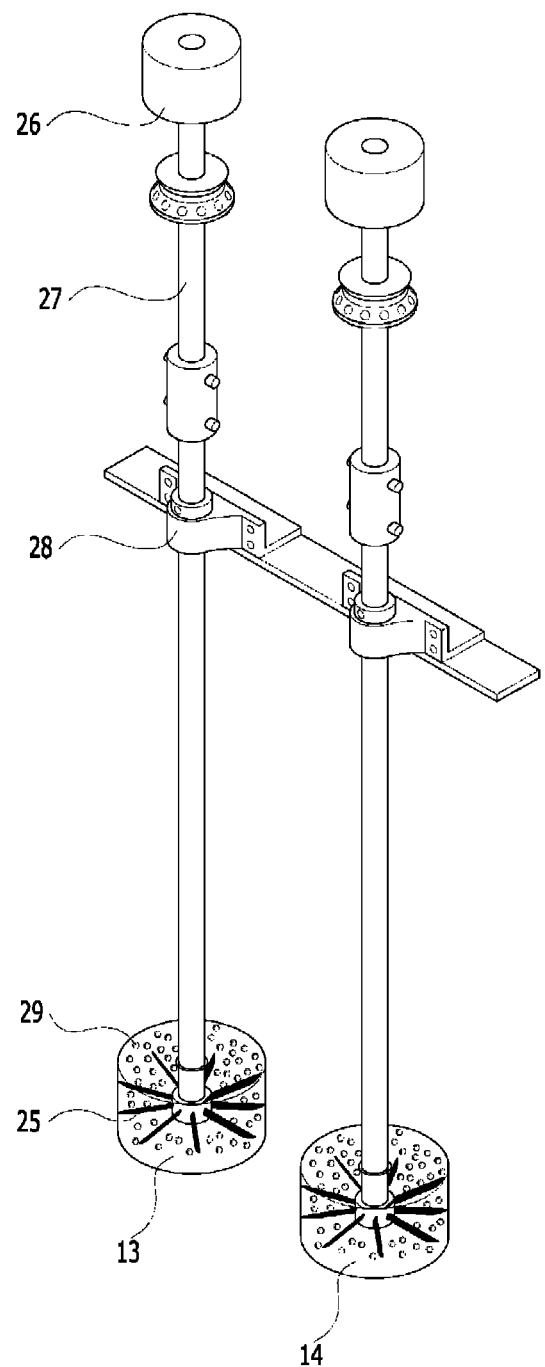
FIG. 4 is a perspective view showing two filters among a plurality of filters of a gas filtration apparatus according to some embodiments.

FIG. 4 is a perspective view showing two filters among the plurality of filters of a gas filtration apparatus according to some embodiments.

In some embodiments, each of the first to eighth filters 13-20 has same configuration. For example, the first and second filters shown in FIG. 4 are disclosed as follows.

A filter case 29 receives and traps the polluted gas and external air which is then divided, through one of the second and third pipelines. The filter case 29 includes one or more bubble filtration hole(s), which releases one or more bubbles disintegrated by a filter fan 25 on the outside of the filter case.

A filter fan 25 is positioned in the inside of the filter case. The filter fan 25 is rotated to disintegrate the one or more bubbles created by the trapped gas. The bubbles are further disintegrated into smaller pieces by centrifugal force from the spinning. While the bubbles pop in the filter case 29, a polluted gas is filtrated by the disintegration and purification of the first water.

The filter fan 25 is connected with a fan motor 26 and a fan shaft 27. The applied turning force is delivered from the fan motor 26 to the filter fan 25, which includes a bearing for preventing shakes, allowing for delivery of a stable turning force.

A fan motor 26 generates the power to rotate the filter fan 25, and a fan shaft 27 transmits the power from the fan motor to the filter fan. Further, a bearing 28 coupled with the fan shaft 27 reduces the sway of the fan shaft. In some embodiments, the fan motor 26 includes a 1.5HP, 115V AC motor with a speed of 1,725 RPM. The fan motor 26 also includes a 7 inch motor. These numerical values exemplify an example of the fan motor 26 having 2 inch diameter pipelines. The values are variable according to the sizes of pipelines.

This structure of filters as described above solves the problem that filtration rate is getting lower when the bubbles size gets bigger because it reduces both contact area and contact time.

Figure 5:
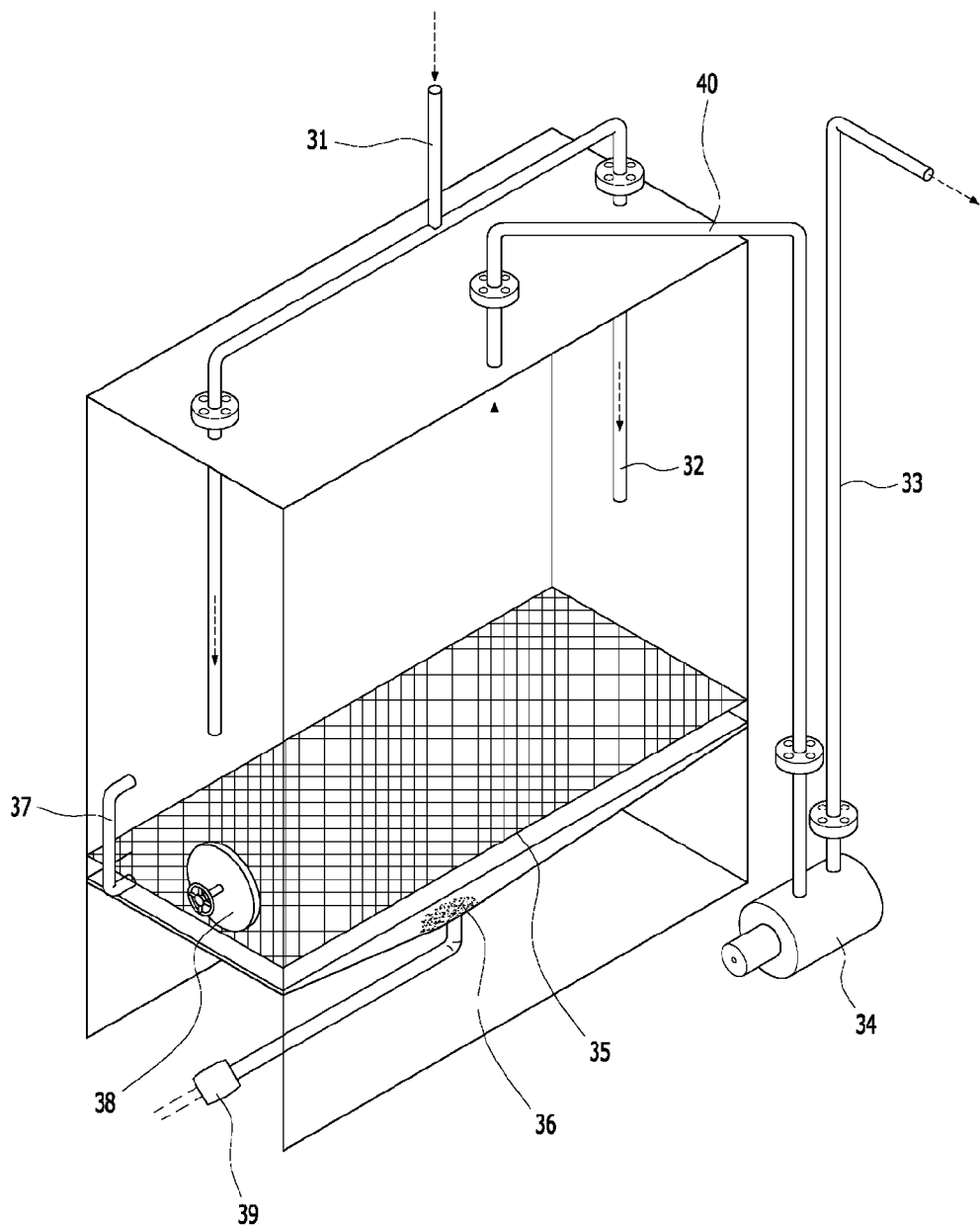
FIG. 5 is a perspective view showing a tank which includes a gas inhaling pump motor according to some embodiments.

FIG. 5 is a perspective view showing a tank which includes a gas inhaling pump motor according to some embodiments.

In some embodiments, a gas which includes smoke, smell, and water is inhaled from the outside of the gas filtration apparatus into a tank through a gas inlet 31. An amount of the gas inhaled is controlled by a gas inhaling pump motor 34.

One or more impurities and water are included in the inhaling gas. Among the one or more impurities and water, one which is heavier than the gas is fallen into the bottom of the tank. Thus, a gas which includes at least one of smoke, smell, and dusts is transmitted to an inhale pump 34. An inhaling power of the gas inhaling pump motor 34 is adjusted according to a size of pipes installed in the gas filtration apparatus. The gas inhaled by the gas inhaling pump motor 34 is transmitted to other tanks or facilities for further purifying procedures.

Meanwhile, the impurities and water, which are fallen into the bottom of the tank, are collected in a collecting unit 36. The collected impurities and water are emitted from the tank through a waste water pipe 39. Thus, collecting and emitting bundle is configured to include the collecting unit 36 and waste water pipe 39.

Furthermore, as shown in FIG. 5, the tank which is connected to the gas inhaling pump motor 34 also includes a cleaning door 38 and a walking plate 35 which are used for cleaning procedure of the inside of the tank. Further, the tank also includes a moisture sensor 37 to detect an amount of the moisture of the inside of the smell removing tank.

Figure 6:
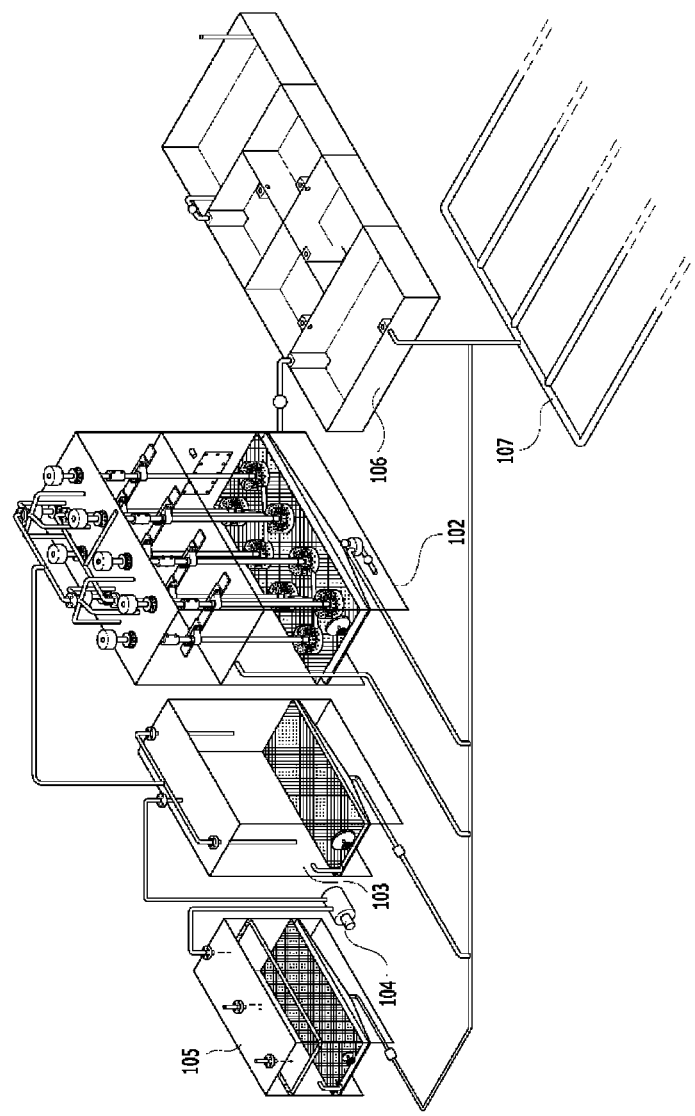
FIG. 6 is a perspective view showing a smell removing tank of a gas filtration system according to some embodiments.

FIG. 6 is a perspective view showing a smell removing tank of a gas filtration system according to some embodiments.

In some embodiments, a gas filtration system includes a smell removing tank for removing smell in water, as shown in FIG. 6. For the removing, the water is transmitted to a septic tank 106 and a precipitation tank 107 and deposited into soils. The precipitation tank 107 includes the soils.

The removing is started by a timer which is installed on the space between a gas filtration apparatus 102 and the septic tank 106. Thus, the removing is processed at predetermined time which is set by the timer.

Further, waste water is supplied into the inside of the gas filtration apparatus 102 through a pipe connected to the outside of the gas filtration apparatus 102. The supplied water is transmitted to the septic tank 106 and precipitation tank 107 through a connecting pipe, and deposited into soils in the precipitation tank 107.

Figure 7:
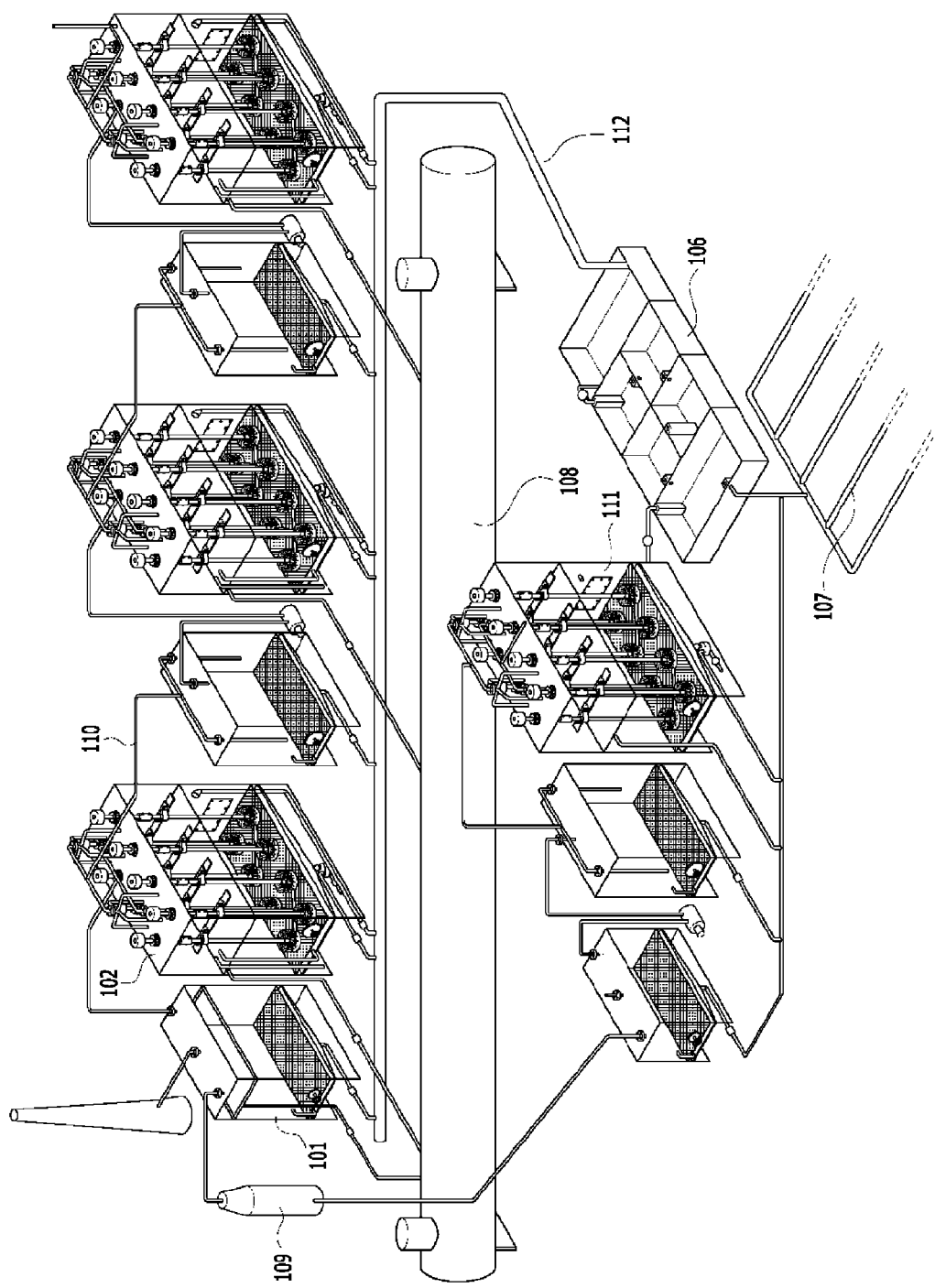
FIGS. 7-8 are perspective views showing gas filtration systems according to some embodiments.

While the waste water is transmitting, a gas inhaling pump motor 104 is operated to for further removing smell in the waste water. Thus, a gas inhaled from the outside of the gas filtration apparatus 102 is inhaled, and the inhaled gas is divided into a plurality parts by pipes and filters placed in the gas filtration apparatus 102. Further, filter fans further disintegrate the inhaled gas into smaller pieces by centrifugal force from spinning. While the bubbles created by the inhaled gas pop in the filter, a smell is removed by the disintegration and purification of the water in the gas filtration apparatus 102. Further, the purified gas is transmitted to a water collecting unit 103, and then, transmitted to the gas moving unit 105 through a pipe and inhaling pump 104, for further purifying. The transmitted gas is incinerated by an incinerator 109; FIG. 7.

That is, in some embodiments, according to the configuration as shown in FIG. 6, when the inhaling pump motor 104 inhales the external air in the amount of 60, another external air is inhaled in the amount of 40. Then, the total mixture of the air flow which is the amount of 100 is transmitted for removing smell in the waste water. Thus, the smell removing tank collects and removes the smell and moisture in the waste water.

FIG. 7 is a perspective view showing a gas filtration system according to some embodiments.

In some embodiments, the gas filtration system includes an incinerator 109, which incinerate a gas released from the gas filtration apparatus 102. In some embodiments, the incinerator 109 further includes a moisture removing unit, which removes moisture in the filtered gas flow prior to incineration.

FIG. 7 is a perspective view showing some embodiments of the gas filtration system including the incinerator 109. The gas filtration system includes a plurality of gas filtration apparatus which are connected by one or more connecting pipelines which transmits the filtered gas flow released from the gas outlet of one of the plurality of the gas filtration apparatus to the gas suction unit of another one of the plurality of the gas filtration apparatus. That is, a cleaner gas is obtained through re-filtration process that a filtrated gas from any one of filtration apparatuses is re-filtrated in one of others. To respond to a variety of gas emission standards, the number of gas filtration apparatus is flexibly increased in the gas filtration system.

In some embodiments, the gas filtration system includes one or more waste water pipes 108. The waste water pipe collects waste water released from the plurality of gas filtration apparatuses and delivers it to the septic tank 106 or precipitation tank 107. In some embodiment, the septic tank 106 includes a septic pump. The septic pump transmits water in the septic pump between section tanks of the septic tank, and ashes and impurities in the water is deposited into the bottom of the septic tank while the transmitting.

Figure 8:
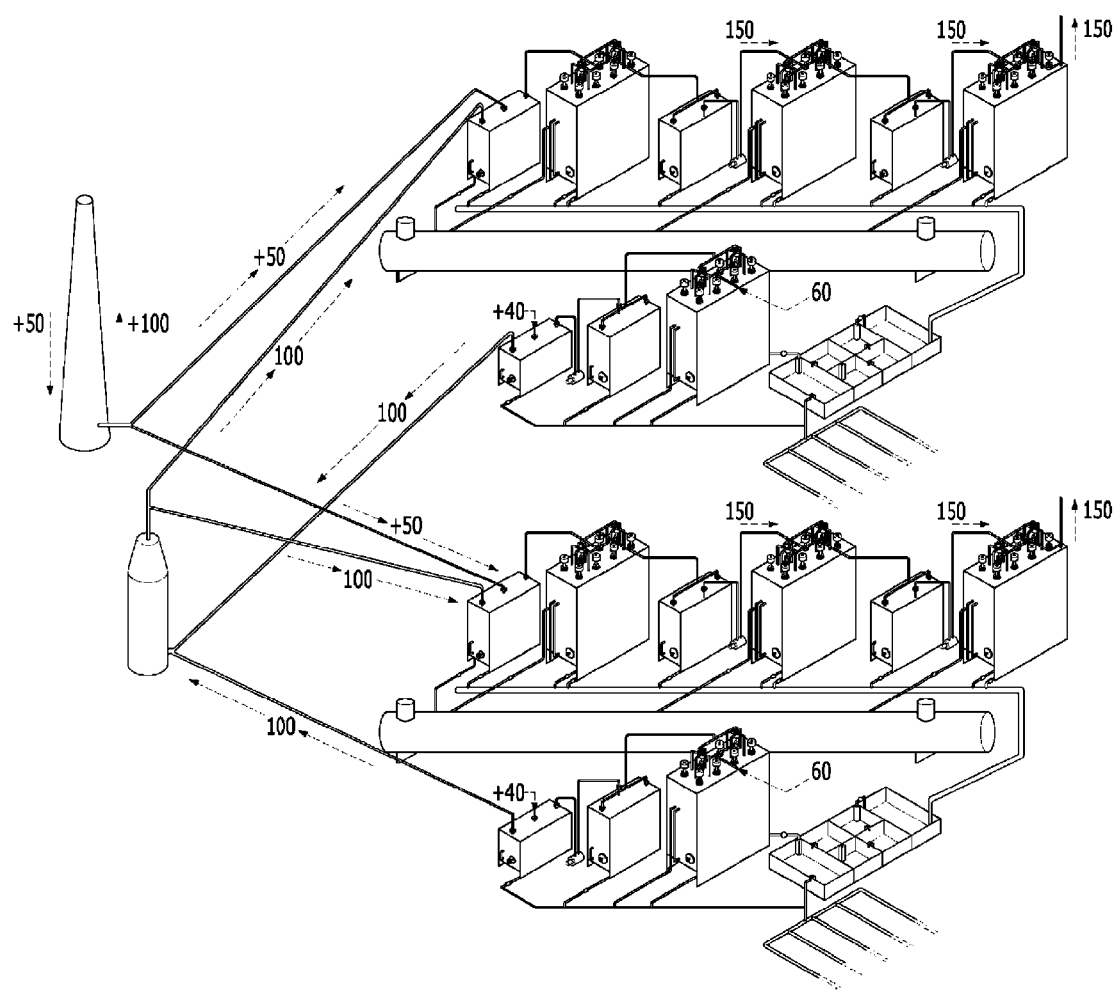

FIG. 8 is a perspective view showing a gas filtration system according to some embodiments.

In some embodiments, various combinations for the gas filtration system can be configured to connect the plurality of the gas filtration apparatus, septic tank, precipitation tank, and incinerator. The configurations form the gas filtration system through recombination depending on the purpose, use and emission standard.

Due to versatility and variety, the system can filter many types of smoke. For example, it is applicable to thermal power plants, oil refineries, petrochemical plants, paper mills, waste incinerators, cement plants, tire factories, plastic factories, cogeneration plants, foundries, steel mills, etc. It is also applied to various smoke emissions, gases, dusts, odors, steam, etc.

The exemplary embodiments are explained above. However, the foregoing invention shall not be limited to the specific embodiments. A person of skill in the art will be able to affect various changes, substitutions of equivalents and aspects of the invention as broadly disclosed herein. The variant of the invention is not understood individually from the technological spirit and outlook of the invention.

The invention claimed is:

1. A gas filtration apparatus, comprising:
    a gas suction unit configured to transmit a first gas flow which includes a polluted gas and external air to a first pipeline;
    the first pipeline configured to
       divide the first gas flow into a second gas flow and a third gas flow, and
       transmit the second and third gas flow to a second pipeline bundle,
    the second pipeline bundle configured to
       divide each of the second and third gas flow into two or more gas flows, and
       transmit each of the divided two or more gas flows to each of a plurality of filters;
    a purifying tank configured to contain first water for purifying a gas released from a plurality of filters;
    the plurality of filters
       positioned in the purifying tank to be sunk under the first water, and
       configured to disintegrate one or more bubbles created by the divided two or more gas flows from the second gas flow and the third gas flow; and
    a gas outlet configured to
       collect a plurality of bubbles emitted from the first water, and
       release the collected bubbles as a filtered gas flow to the outside of the gas filtration apparatus,
    wherein the each of the plurality of the filters comprises:
    a filter case configured to receive and trap one gas flow among the divided gas flows transmitted from the second pipeline bundle;
    a filter fan
       positioned in the inside of the filter case, and
       configured to be rotated to disintegrate the one or more bubbles created by the trapped one gas flow;
    a fan motor configured to generate a power to rotate the filter fan; and
    a fan shaft configured to transmit the power from the fan motor to the filter fan.

2. The gas filtration apparatus according to claim 1, wherein the each of the plurality of the filters further comprises a bearing
    coupled with the fan shaft, and
    configured to reduce a sway of the fan shaft.

3. The gas filtration apparatus according to claim 1, wherein the second pipeline bundle comprising:
    a second pipeline configured to
       divide the second gas flow into two or more gas flows, and
       transmit each of the divided two or more gas flows from the second gas flow to each of the plurality of filters; and
    a third pipeline configured to
       divide the third gas flow into two or more gas flows, and
       transmit each of the divided two or more gas flows from the third gas flow to each of the plurality of filters.

4. The gas filtration apparatus according to claim 3, wherein the second pipeline is configured to divide the second gas flow to four gas flows, and the third pipeline is configured to divide the third gas flow to four gas flows, and wherein the plurality of filters includes physically separated eight filters.

5. The gas filtration apparatus according to claim 1, wherein the first pipeline is further configured to divide the first gas flow into three or more gas flows, and transmit the three or more gas flows to three or more pipelines which further divide the three or more gas flows.

6. The gas filtration apparatus according to claim 1, wherein the gas suction unit comprises a suction motor configured to suck the external air into the inside of the gas suction unit.

7. The gas filtration apparatus according to claim 6, wherein the gas suction unit is further configured to detect whether the suction motor is working properly, and release the polluted gas to the outside of the gas filtration apparatus if the suction motor is not working properly.

8. The gas filtration apparatus according to claim 1, wherein the purifying tank comprises a suction pump configured to suck one or more impurities in the first water.

9. The gas filtration apparatus according to claim 1, wherein the purifying tank comprises a first impurity collector configured to collect one or more impurities settled in the first water.

10. The gas filtration apparatus according to claim 1, wherein the gas suction unit comprises:

a gas suction tank configured to contain second water for settling one or more impurities contained in the first gas flow;

a second impurity collector configured to collect the one or more settled impurities; and a waste water outlet configured to release waste water transmitted from the second impurity collector.

11. The gas filtration apparatus according to claim 10, wherein the gas suction unit is further configured to detect an empty state of the gas suction tank after releasing the waste water, and spray the second water to a sidewall of the gas suction tank to fill the second water in the gas suction tank.

12. A gas filtration system comprising:

a gas filtration apparatus comprising a gas suction unit configured to transmit a first gas flow which includes a polluted gas and external air to a first pipeline, the first pipeline configured to divide the first gas flow into a second gas flow and a third gas flow, and transmit the second and third gas flow to a second pipeline bundle, the second pipeline bundle configured to divide each of the second and third gas flow into two or more gas flows, and transmit each of the divided two or more gas flows to each of a plurality of filters;

a purifying tank configured to contain first water for purifying a gas released from a plurality of filters, the plurality of filters positioned in the purifying tank to be sunk under the first water, and configured to disintegrate one or more bubbles created by the divided two or more gas flows from the second gas flow and the third gas flow, and a gas outlet configured to collect a plurality of bubbles emitted from the first water, and release the collected bubbles as a filtered gas flow to the outside of the gas filtration apparatus;

an incinerator configured to incinerate the filtered gas flow;

a septic tank configured to purify waste water released from the gas filtration apparatus; and a precipitation tank configured to precipitate one or more impurities contained in at least one of the waste water released from the gas filtration and waste water released from the septic tank.

13. The gas filtration apparatus according to claim 12, wherein the incinerator comprises a moisture removing unit configured to remove moisture in the filtered gas flow before the incineration.

14. The as filtration apparatus according to claim 12, wherein the gas suction unit comprises:

a gas suction tank configured to contain second water for settling one or more impurities contained in the first gas flow;

a second impurity collector configured to collect the one or more settled impurities; and a waste water outlet configured to release waste water transmitted from the second impurity collector.

15. The gas filtration apparatus according to claim 14, wherein the gas suction unit is further configured to detect an empty state of the gas suction tank after releasing the waste water, and spray the second water to a sidewall of the gas suction tank to fill the second water in the gas suction tank.

16. The gas filtration apparatus according to claim 12, wherein the gas suction unit comprises a suction motor configured to suck the external air into the inside of the gas suction unit.

17. The gas filtration apparatus according to claim 16, wherein the gas suction unit is further configured to detect whether the suction motor is working properly, and release the polluted gas to the outside of the gas filtration apparatus if the suction motor is not working properly.

18. The gas filtration apparatus according to claim 12, wherein the purifying tank comprises a suction pump configured to suck one or more impurities in the first water.

19. A gas filtration system comprising:

a plurality of a gas filtration apparatus comprising a gas suction unit configured to transmit a first gas flow which includes a polluted gas and external air to a first pipeline, the first pipeline configured to divide the first gas flow into a second gas flow and a third gas flow, and transmit the second and third gas flow to a second pipeline bundle, the second pipeline bundle configured to divide each of the second and third gas flow into two or more gas flows, and transmit each of the divided two or more gas flows to each of a plurality of filters;

a purifying tank configured to contain first water for purifying a gas released from a plurality of filters, the plurality of filters positioned in the purifying tank to be sunk under the first water, and configured to disintegrate one or more bubbles created by the divided two or more gas flows from the second gas flow and the third gas flow, and a gas outlet configured to collect a plurality of bubbles emitted from the first water, and release the collected bubbles as a filtered gas flow to the outside of the gas filtration apparatus;
one or more connecting pipelines configured to transmit the filtered gas flow released from the gas outlet of one of the plurality of the gas filtration apparatus to the gas suction unit of another one of the plurality of the gas filtration apparatus; and
waste water pipes configured to
- collect waste water released from the plurality of the gas filtration apparatus, and
- transmit the collected waste water to a septic tank, wherein the each of the plurality of the filters comprises:
a filter case configured to receive and trap one gas flow among the divided gas flows transmitted from the second pipeline bundle;
a filter fan
- positioned in the inside of the filter case, and
- configured to be rotated to disintegrate toe one or more bubbles created by the trapped one gas flow;

a fan motor configured to generate a power to rotate the filter fan; and
a fan shaft configured to transmit the power from the fan motor to the filter fan.

* * * * *